United States Patent Office 3,099,653
Patented July 30, 1963

3,099,653
BENZOTHIAZOLE AZO 2,3-HYDROXY-NAPHTHOIC ACID AMIDE DYES
James M. Straley and Raymond C. Harris, Kingsport, Tenn., assignors to Eastman Kodak Company, Rochester, N.Y., a corporation of New Jersey
No Drawing. Filed Jan. 21, 1960, Ser. No. 3,723
5 Claims. (Cl. 260—158)

This invention relates to new azo compounds and their application to the art of dyeing or coloring. More particularly, it relates to certain metallized and non-metallized benzothiazole azo compounds and their application to the dyeing or coloring of acrylonitrile polymeric materials, especially polyacrylonitrile textile materials.

The azo compounds of our invention consist of the monoazo compounds, devoid of a water-solubilizing group, having the formula:

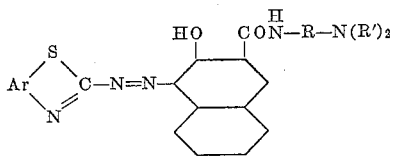

wherein Ar represents an ortho-arylene radical of the benzene series, R represents an alkylene radical having 2 to 3 carbon atoms, R' represents an alkyl radical having 1 to 4 carbon atoms and wherein $N(R')_2$ collectively represents a member selected from the group consisting of a morpholinyl radical and a piperidyl radical and their metal complexes containing a metal selected from the group consisting of nickel, cobalt and chromium.

The non-metallized monoazo compounds of our invention are prepared by diazotizing a 2-aminobenzothiazole compound having the formula:

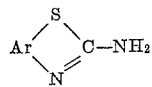

wherein Ar represents an ortho-arylene radical of the benzene series devoid of a water-solubilizing group and coupling the diazonium compound obtained with a naphthalene compound having the formula:

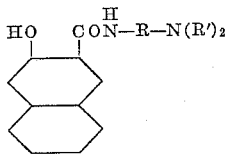

wherein R, R' and $N(R')_2$ have the meaning previously assigned to them. The metallized azo compounds of our invention are prepared by metallizing the non-metallized azo compounds with appropriate metallizing agents in accordance with known metallizing procedures. The manner in which metallization can be carried out is fully described hereinafter.

Nickel chloride, nickel bromide, nickel sulfate, nickel acetate, nickel formate, nickel thiocyanate [$Ni(SCN)_2$], cobaltous bromide, cobaltic chloride, cobaltous chloride, cobaltous acetate, cobalt thiocyanate [$Co(SCN)_2$], chromium trichloride, chromium tribromide, chromic sulfate, chromic acetate and chromium thiocyanate [$Cr(SCN)_3$], for example, are illustrative of the metallizing agents that can be employed.

Both the non-metallized and the metallized azo compounds of our invention can be applied to polyacrylonitrile textile materials in the form of an aqueous dispersion. Coloration can also be effected by incorporating the non-metallized or metallized azo compounds into the spinning dope, spinning the fiber as usual and converting the non-metallized azo compounds to their metallized form if desired. Also the metallizing agent can be incorporated in the spinning dope, the fiber spun as usual and then treated in a dyebath containing one or more of the non-metallized azo compounds to form the metal complex on the fiber.

The non-metallized monoazo compounds yield orange to red shades on polyacrylonitrile materials. The metallized compounds yield violet to blue shades, which have good fastness to light, washing and gas, on polyacrylonitrile materials, such as acrylic fibers. The metallized dyeings have better fastness to washing than the corresponding non-metallized dyeings and frequently have improved fastness to light. Among the acrylonitrile polymers that can be dyed or colored with the non-metallized and metallized azo compounds of our invention are those disclosed in Straley and Giles U.S. Patent 2,857,372, issued October 21, 1958.

2-aminobenzothiazole,
2-amino-6-methylsulfonylbenzothiazole,
2-amino-6-ethylsulfonylbenzothiazole,
2-amino-6-n-propylsulfonylbenzothiazole,
2-amino-6-n-butylsulfonylbenzothiazole,
2-aminobenzothiazole-6-N-methylsulfonamide,
2-aminobenzothiazole-6-N-ethylsulfonamide,
2-aminobenzothiazole-6-N-n-propylsulfonamide,
2-aminobenzothiazole-6-N-n-butylsulfonamide,
2-amino-6-methoxybenzothiazole,
2-amino-6-ethoxybenzothiazole,
2-amino-6-n-propoxybenzothiazole,
2-amino-6-n-butoxybenzothiazole,
2-amino-6-methylbenzothiazole,
2-amino-6-ethylbenzothiazole,
2-amino-6-n-propylbenzothiazole,
2-amino-6-n-butylbenzothiazole,
2-amino-6-β-hydroxyethylbenzothiazole,
2-amino-6-γ-hydroxypropylbenzothiazole,
2-amino-6-δ-hydroxybutylbenzothiazole,
2-amino-6-acetylaminobenzothiazole,
2-amino-6-n-propionylaminobenzothiazole,
2-amino-6-n-butyrylaminobenzothiazole,
2-amino-6-thiomethylbenzothiazole,
2-amino-6-thiocyanobenzothiazole,
2-amino-6-tri-fluoromethylbenzothiazole,
2-amino-6-chlorobenzothiazole,
2-amino-6-nitrobenzothiazole,
2-amino-4,7-dimethoxybenzothiazole,
2-amino-5,6-dimethoxybenzothiazole,
2-amino-4,7-diethoxybenzothiazole, and
2-amino-4,6-dimethylbenzothiazole are representative of the 2-aminobenzothiazole compounds used in the preparation of the azo compounds of our invention.

2-hydroxy-N-3-(β-dimethylaminoethyl)naphthamide,
2-hydroxy-N-3-(β-diethylaminoethyl)naphthamide,
2-hydroxy-N-3-(β-di-n-propylaminoethyl)naphthamide,
2-hydroxy-N-3-(β-di-n-butylaminoethyl)naphthamide,
2-hydroxy-N-3-(γ-dimethylaminopropyl)naphthamide,
2-hydroxy-N-3-(γ-diethylaminopropyl)naphthamide,
2-hydroxy-N-3-(γ-di-n-butylaminopropyl)naphthamide,
2-hydroxy-N-3-(β-morpholinylethyl)naphthamide,
2-hydroxy-N-3-(γ-morpholinylpropyl)naphthamide,
2-hydroxy-N-3-(β-piperidylethyl)naphthamide and
2-hydroxy-N-3-(γ-piperidylpropyl)naphthamide are illustrative of the coupling components used in preparing the azo compounds of our invention.

The coupling components can be prepared by reacting 2-hydroxy-3-naphthoic acid chloride or 2-acetoxy-3-naphthoic acid chloride with an amine having the formula:

$$H_2N-R-N(R')_2$$

wherein R, R' and $N(R')_2$ have the meaning previously assigned to them. When 2-acetoxy-3-naphthoic acid chloride is employed the acetyl group is split off by known methods after the reaction with the amine is complete.

The following examples illustrate the invention.

*Example 1*

15 grams of 2-aminobenzothiazole were dissolved in 240 cc. of water and 140 cc. of 96% sulfuric acid, cooled to 0° C., and diazotized by the addition of a nitrosyl sulfuric acid solution previously prepared from 7.2 grams of sodium nitrite and 50 cc. of 96% sulfuric acid. Diazotization was carried out at a temperature below 5° C., with stirring. A coupling solution was prepared by dissolving 27 grams of 2-hydroxy-N-3-(γ-dimethylaminopropyl)naphthamide in 400 cc. of water and 15 cc. of glacial acetic acid and the temperature was brought to 5° C. by the addition of crushed ice. The diazonium solution was added over a period of about 20 minutes, with stirring, and stirring was continued for 45 minutes longer, adding ice as necessary to maintain the temperature of the reaction mixture at 5° C. or below. Upon completion of the coupling reaction the reaction mixture was made neutral to Congo red paper by the addition of sodium carbonate and the dye compound which precipitated was recovered by filtration, washed well with water and air-dried. The dye compound thus obtained has the formula:

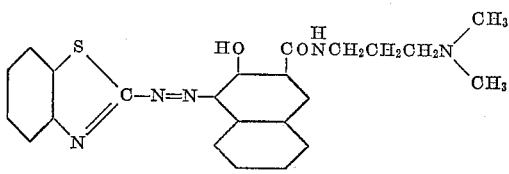

and dyes polyacrylonitrile fibers red shades. The nickel, cobalt and chromium complexes yield blue shades on acrylic fibers such as Orlon 42 and Verel which are fast to light, washing and gas.

*Example 2*

1.08 grams of the non-metallized monazo dye compound of Example 1, 15 cc. of acetone and 2 cc. of 28% aqueous ammonium hydroxide were refluxed together and a solution of 0.7 gram of $Ni(OOCCH_3)_2 \cdot 4H_2O$ in 15 cc. of 50% aqueous acetone was added over a period of 15 minutes. Refluxing was continued for three hours after which the reaction mixture was poured into 400 cc. of water and the temperature brought to 80° C. 10 grams of sodium chloride were added, with stirring, and then the reaction mixture was allowed to cool to room temperature. The metallized dye product, a so-called 1:2 complex in which nickel and the monoazo compound are combined in the ratio of about one atom of nickel to 2 molecules of the monoazo compound, which precipitated was recovered by filtration, washed with a 2% aqueous sodium chloride solution and air-dried. It colors polyacrylonitrile textile fibers, such as Orlon 42 and Verel, blue shades which have good fastness to light, washing and gas.

*Example 3*

A solution of nitrosyl sulfuric acid was prepared from 1.52 grams of sodium nitrite and 20 cc. of 96% sulfuric acid. 20 cc. of propionic-acetic (1:5) acid were added below 8° C. and then a solution of 3.6 grams of 2-amino-6-methoxybenzothiazole in 20 cc. of propionic-acetic (1:5) acid was added at a temperature below 5° C. The reaction mixture thus obtained was stirred at 5° C. for two hours. The diazonium solution thus prepared was stirred into a coupler solution prepared by dissolving 5.5 grams of 2-hydroxy-N-3-(γ-dimethylaminopropyl)naphthamide in 100 cc. of 5% aqueous acetic acid and enough crushed ice was added to maintain the temperature below 5° C. After stirring for an additional two hours, the reaction mixture was made neutral to Congo red paper by the addition of sodium carbonate and the dye compound which precipitated was recovered by filtration, washed well with water and dried. It dyes polyacrylonitrile orange shades. The nickel, cobalt and chromium complexes yield slightly greener shades on acrylic fibers, such as Orlon 42 and Verel, which are fast to light, gas and washing.

*Example 4*

23 grams of 2-amino-6-methylsulfonylbenzothiazole were diazotized and the diazonium compound obtained was coupled with 28 grams of 2-hydroxy-N-3-(β-diethylaminoethyl)naphthamide. Diazotization, coupling and recovery of the dye compound formed were carried out in accordance with the procedure described in Example 1. The dye compound obtained dyes polyacrylonitrile textile materials orange shades. The nickel, cobalt and chromium complexes yield blue-violet shades on acrylic fibers such as Orlon 42 and Verel which are fast to light, washing and gas.

*Example 5*

3.3 grams of 2-amino-6-methylbenzothiazole were diazotized and the diazonium compound obtained was coupled with 5.3 grams of 2-hydroxy-N-3-(β-dimethylaminoethyl)naphthamide. Diazotization, coupling and recovery of the dye compound formed were carried out in accordance with the procedure described in Example 3. The dye compound obtained dyes polyacrylonitrile textile materials red shades. The nickel, cobalt and chromium complexes yield blue shades on acrylic fibers, such as Verel and Orlon 42, which are fast to light, washing and gas.

*Example 6*

15 grams of 2-aminobenzothiazole were diazotized and the diazonium compound obtained was coupled with 28 grams of 2-hydroxy-N-3-(β-diethylaminoethyl)naphthamide. Diazotization, coupling and recovery of the dye compound formed were carried out in accordance with the procedure described in Example 1. The dye compound obtained dyes polyacrylonitrile textile materials red shades. The nickel, cobalt and chromium complexes yield blue shades on acrylic fibers, such as Verel and Orlon 42, which are fast to light, washing and gas.

*Example 7*

15 grams of 2-aminobenzothiazole were diazotized and the diazonium compound obtained was coupled with 25.5 grams of 2-hydroxy-N-3-(β-dimethylaminoethyl)naphthamide. Diazotization, coupling and recovery of the dye compound formed were carried out in accordance with the procedure described in Example 1. The dye compound obtained dyes polyacrylonitrile textile materials red shades. The nickel, cobalt and chromium complexes yield blue shades on acrylic fibers, such as Verel and Orlon 42, which are fast to light, washing and gas.

*Example 8*

4.21 grams of the non-metallized dye of Example 1 were added in small portions to a solution of 5.4 grams of $CrCl_3 \cdot 6H_2O$ in 50 cc. of ethyleneglycol at 140° C. The reaction mixture was stirred at 140° C. for one hour longer, cooled to 80° C. and then poured into 120 cc. of a 10% aqueous sodium chloride solution. Impurities were removed by filtration and the dye product was precipitated from the filtrate by making it basic with 10% $NH_4OH$. The chromium complex, a so-called 1:2 complex in which chromium and the monoazo compound are combined in the ratio of about one atom of chromium to 2 molecules of the monoazo compound, of the dye of Example 1 was recovered by filtration, washed with a 10% aqueous sodium chloride solution and air-dried. It yields reddish-blue shades on polyacrylonitrile textile materials made of Verel or Orlon 42 acrylic fibers which have good fastness to light, gas and washing.

*Example 9*

188 grams of 2-hydroxy-3-naphthoic acid were slurried in 1000 cc. of dry benzene. A solution of 122 grams of $SOCl_2$ in 500 cc. of dry benzene was added over a period of 30 to 45 minutes. The reaction mixture resulting was stirred for 2.5 hours at room temperature, then raised slowly to 60° C. and held at this temperature until a clear solution resulted (about 2 hours). The excess $SOCl_2$, $SO_2$ and HCl was removed under vacuum while keeping the pot temperature at 60° C. or below. The last traces of $SOCl_2$, $SO_2$ and HCl were removed by passing a slow stream of dry air through the reaction mixture for about 15 minutes. The reaction mixture was cooled to 25° C. and 138 grams of anhydrous $K_2CO_3$ were added, after which a solution of 110 grams of 3-dimethylaminopropylamine in 300 cc. of dry benzene was added dropwise while keeping the pot temperature at 60° C. or below. The reaction mixture was stirred 6 hours longer at room temperature, then raised to 65° C. and filtered hot. The material collected on the filter was washed with three 2-liter portions of hot benzene. The combined filtrates were concentrated under vacuum to ⅓ their volume below 70° C. The reaction mixture was cooled to room temperature. The desired product which precipitated was recovered by filtration. A yield of 240 grams of N-(γ-dimethylaminopropyl)-2-hydroxy-3-naphthamide was obtained.

Following the general procedure described in the example just given the other naphthamide coupling components are readily prepared.

The following tabulation further illustrates the azo compounds of our invention and sets forth (1) the colors the non-metallized azo compounds yield on polyacrylonitrile textile fabrics made of Verel or Orlon 42 acrylic fiber and (2) the colors obtained when the non-metallized dyeings are metallized with nickel thiocyanate. "Original" refers to the non-metallized dyeing and "Final" refers to the metallized dyeing.

| 2-aminobenzothiazole compound | Coupler | | Color | |
|---|---|---|---|---|
| | R | R' | Original | Final |
| 6-Nitro | —(CH₂)₃— | —C₂H₅ | orange | violet. |
| 6,7-Dichloro | —(CH₂)₂— | n-C₃H₇ | do | blue-violet. |
| 5,6-dimethoxy | —(CH₂)₃— | —CH₃ | do | blue. |
| 6-thiocyano | —(CH₂)₃— | —CH₃ | do | blue-violet. |
| 5-methoxy | —(CH₂)₃— | —C₂H₅ | red | blue. |
| 6-n-butoxy | —(CH₂)₃— | —CH₃ | do | Do. |
| 6-cyano | —(CH₂)₂— | n-C₄H₉ | orange | blue-violet. |
| | R | N(R')₂ | | |
| 6-methoxy | —(CH₂)₃— | morpholinyl | red | blue. |
| 6-methoxy | —(CH₂)₃— | piperidyl | do | Do. |
| Unsubstituted | —(CH₂)₂— | morpholinyl | do | Do. |
| 6-ethoxy | —(CH₂)₂— | piperidyl | do | Do. |

The non-metallized azo compounds disclosed in the foregoing tabulation can also be metallized with a suitable cobalt or chromium metallizing agent, especially cobalt thiocyanate and chromium thiocyanate, to form the cobalt and chromium complexes thereof. The cobalt complexes yield about the same colors as the corresponding nickel complexes. In the case of the chromium complexes the color tends to be redder. As shown hereinbefore metallization can also be effected off the fiber.

The non-metallized and metallized azo compounds described herein can be applied to acrylonitrile polymers, such as polyacrylonitrile and acrylonitrile graft polymers, in the form of an aqueous dispersion.

The following example illustrates one satisfactory way in which the non-metallized azo compounds can be used to dye an acrylonitrile polymer textile material. .1 gram of dye is dissolved by warming in 5 cc. of methyl Cellosolve. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with water and dried. The metallized dyeing, in which the 1:2 metal complex is formed in situ on the material being dyed, can be obtained, for example, in accordance with the procedure described in Example 10. A 3% solution of a salt, other than the thiocyanate salt, can be used. However, we have found the use of the thiocyanates of nickel, cobalt and chromium to be particularly advantageous.

The premetallized azo dyes can be applied in the same general manner as the non-metallized azo dyes. However, in order to mitigate the possibility of demetallization during dyeing 5 cc. of a 5% aqueous solution of a weak acid such as boric acid is used instead of formic acid or acetic acid. Except for this change the dyeing conditions are the same.

*Example 10*

A polyacrylonitrile textile fabric dyed red with a 1% dyeing (by weight of pure dye) of the dye product of Example 1 was padded with a 3% aqueous solution of nickel thiocyanate under conditions such that a 60 to 100% pick up, based on the weight of the fabric, was obtained. The polyacrylonitrile fabric was then aged in a steam chest under 5 p.s.i. pressure for 10 minutes after which it was scoured at 60° C. with soap and water, rinsed well with water and dried. The polyacrylonitrile fabric was dyed a blue shade having good fastness to light, washing and gas.

The non-metallized and metallized azo compounds described herein are devoid of water-solubilizing groups such as the carboxylic acid and the sulfonic acid groups. Any other suitable method known to the art can be used to apply them to acrylonitrile polymeric materials.

The invention has been described in detail with particular reference to preferred embodiments thereof, but it will be understood that variations and modifications can be effected within the spirit and scope of the invention as described hereinabove and as defined in the appended claims.

The expression "propionic-acetic (1:5) acid" refers to a mixture of propionic and acetic acids in which there are five parts by volume of acetic acid to 1 part by volume of propionic acid.

We claim:

1. The monoazo compounds, devoid of a water-solubilizing group, having the formula:

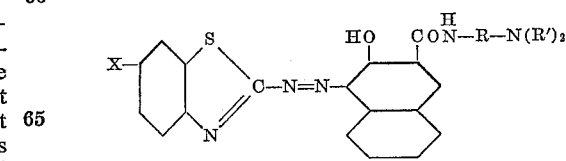

wherein X represents a member selected from the class consisting of a hydrogen atom, lower alkyl, lower alkoxy, nitro and thiocyano radicals, R represents an alkylene radical having 2 to 3 carbon atoms, R' represents an alkyl radical having 1 to 4 carbon atoms and wherein N(R')₂ collectively represents a member selected from the group consisting of a morpholinyl radical and a piperidyl radical.

2. The monoazo compound having the formula:
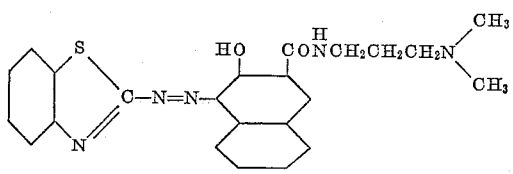
3. The monoazo compound having the formula:
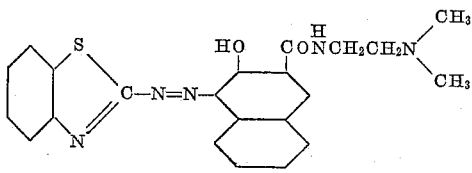
4. The monoazo compound having the formula:
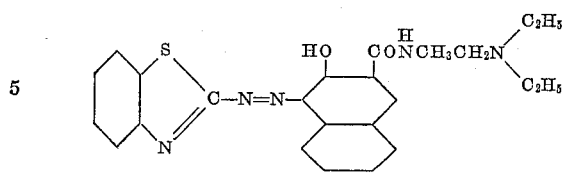
5. The monoazo compound having the formula:
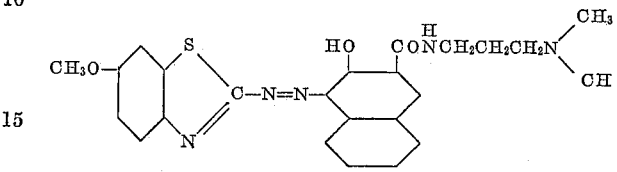
References Cited in the file of this patent
UNITED STATES PATENTS
| | | |
|---|---|---|
| 2,128,256 | Krzikalla et al. | Aug. 30, 1938 |
| 2,402,538 | Dreyfus | June 25, 1946 |
| 2,408,421 | Grimmel et al. | Oct. 1, 1946 |
| 2,868,774 | Straley et al. | Jan. 13, 1959 |
| 2,916,482 | Straley et al. | Dec. 8, 1959 |